United States Patent [19]
Andres

[11] Patent Number: 5,126,088
[45] Date of Patent: Jun. 30, 1992

[54] METHOD FOR PRODUCING AN EXTRUSION HAVING A WOOD GRAIN APPEARANCE AND AN ASSOCIATED APPARATUS

[75] Inventor: Thomas Andres, North Versailles, Pa.

[73] Assignee: Thermal Industries, Inc., Pittsburgh, Pa.

[21] Appl. No.: 726,367

[22] Filed: Jul. 5, 1991

[51] Int. Cl.⁵ .............................................. B29C 47/04
[52] U.S. Cl. .................................. 264/171; 264/177.1; 264/245; 425/131.1; 425/133.5; 425/206; 425/376.1; 425/382.3; 425/462
[58] Field of Search ............... 264/75, 245, 171, 177.1; 425/131.1, 133.5, 462, 206, 376.1, 207, 382.3

[56] References Cited

U.S. PATENT DOCUMENTS

| | | |
|---|---|---|
| 1,516,841 | 11/1924 | Buttfield . |
| 1,516,842 | 11/1924 | Buttfield . |
| 2,096,362 | 10/1937 | Lehman . |
| 2,632,204 | 3/1953 | Murray ............................... 264/75 |
| 3,099,859 | 8/1963 | Eilersen ........................... 425/192 R |
| 3,393,426 | 7/1968 | Meienberg ...................... 425/192 R |
| 3,482,006 | 12/1969 | Carlson, Jr. . |
| 3,608,013 | 9/1971 | Ingham ............................... 264/171 |
| 3,769,380 | 10/1973 | Wiley ................................... 264/75 |
| 4,054,403 | 10/1977 | Hornbeck et al. . |
| 4,118,166 | 10/1978 | Bartrum ............................... 425/462 |
| 4,173,445 | 11/1979 | McKelvey et al. . |
| 4,252,755 | 2/1981 | Normanton et al. . |
| 4,564,349 | 1/1986 | Brown . |
| 4,652,224 | 3/1987 | Golisch . |
| 4,859,068 | 8/1989 | Sironi . |
| 4,911,628 | 3/1990 | Heilmayr et al. ................ 425/131.1 |
| 4,921,414 | 5/1990 | Schliehe et al. . |
| 5,053,176 | 10/1991 | Cameron et al. ....................... 264/75 |

FOREIGN PATENT DOCUMENTS 53-90372  8/1978  Japan ..................................... 264/75

Primary Examiner—Jeffery Thurlow
Attorney, Agent, or Firm—Arnold B. Silverman; David V. Radack

[57] ABSTRACT

A method for producing an extrusion having a wood grain appearance. A first extruder including a die and a second extruder which includes a housing and a screw is provided, the screw having a portion disposed within the housing and a portion projecting outwardly from the housing. The second extruder is secured to the die of the first extruder by a pipe, the pipe receiving the outwardly projecting portion of the second extruder screw. A first material is extruded through the first extruder die to produce an extrusion and a second material is introduced into the second extruder. The second material is delivered through the second extruder and the pipe means to bond the second material to at least a portion of the surface of the extrusion to provide an extrusion with at least a portion of its surface having a wood grain appearance. An associated second extruder as well as an apparatus for producing an extrusion having a wood grain appearance is also provided.

17 Claims, 5 Drawing Sheets

METHOD FOR PRODUCING AN EXTRUSION HAVING A WOOD GRAIN APPEARANCE AND AN ASSOCIATED APPARATUS

BACKGROUND OF THE INVENTION

1. Field Of The Invention

This invention relates to a method of producing an extrusion having a wood grain appearance and an associated apparatus.

2. Background Information

It is well known to make extrusions using a screw feed extruder A standard screw feed extruder consists of (i) a cylindrical housing in which a screw is mounted for rotation about its longitudinal axis; (ii) a die and (iii) a puller section. In use, a pelletized or powderized plastic material, such as vinyl, is fed into the screw at one end thereof and is advanced through the housing by the action of the rotating screw. As the plastic material is advanced through the housing it is heated so as to melt the vinyl pellets or powder. The molten vinyl flows through the die to form the shape of the extrusion. The extruded product is pulled by the pulling section through the die to form the elongated extruded product. The elongated extruded product is then cut to desired lengths. See, e.g., U.S. Pat. Nos. 3,482,006; 4,054,403; 4,173,445; 4,252,755; and 4,859,068.

It is also known to produce extrusions having a marbled finish. U.S. Pat. No. 4,921,414 discloses an extrusion apparatus used to make a thermoplastic extrusion having a marbled appearance. That apparatus consists of a main screw feed extruder having an injection cavity and an injection device which is adjacent the injection cavity. The main extruder feeds in the base material into the injection cavity and the marbling material is injected into the injection cavity. These materials are mixed and the mixed materials are extruded through the die.

It is also known to provide different color sections on a main extrusion. This is accomplished by using a portable feed screw satellite extruder such as Model No. VT-1250-20 made by the Entwistle Company of Hudson, Mass. that operates in association with a main extruder. The satellite extruder consists of a housing in which a screw feed means is mounted and a hopper with a feed section. The hopper and feed section holds and feeds into the housing the different color material to be bonded onto the main extrusion made by the main extruder. The housing and the hopper and feed section are slidably mounted on a pole which in turn is connected at its lower section to a base having wheels. The satellite extruder, therefore, is portable and can be adjusted for different heights. The satellite extruder is wheeled to the main extruder and is connected thereto by means of a pipe that extends from the die of the main extruder to the housing of the satellite extruder. The material in the satellite extruder is introduced into the hopper and fed into the housing through the feed section. The screw feed means advances the material through the housing while at the same time melting the material so that it will flow into the die. The melted material then flows through the pipe and into an opening in the die at the same time the main extrusion is being extruded through the die. The second material will flow over the sections of the main extrusion which are desired to be a different color and will bond to the main extrusion. This will produce an extrusion having a section which has a different color than the remainder of the extrusion.

As extrusions are widely used for building products, design considerations sometimes dictate providing a wood grain appearance for a section of the extrusion. For example, a vinyl extrusion might be used for a window frame where it is desired to have an interior section having a wood grain appearance with the remainder of the extrusion being white in color. In this case, the second material which is fed into the second extruder is comprised of a mixture of several colors of pellets or multi-colored powder such as brown, black and white in order to obtain a wood grain finish. This mixture of pellets or powder is fed into the screw feed means and is melted together so that it will flow through the pipe and into the die. A problem has arisen, however, in creating the wood grain appearance. The problem is that the melted pellets mix too quickly, thus forming a solid color on the extrusion instead of a wood grain appearance. The solid color does not look like a wood grain and thus does not meet the design and aesthetic characteristics desired by the maker of the building product.

Therefore, there remains a need for a method to make an extrusion having a wood grain finish and an associated apparatus.

SUMMARY OF THE INVENTION

The method and apparatus of the invention has met the hereinbefore mentioned need. The method comprises providing a first extruder including a die. A second extruder is provided which includes a housing and a screw, the screw having a portion disposed within the housing and a portion projecting outwardly from the housing. The method further comprises connecting the second extruder to the die of the first extruder by a pipe, the pipe receiving the outwardly projecting portion of the second extruder screw. The method further comprises extruding a first material through the first extruder die to produce an extrusion and introducing a second material into the second extruder. The second material is delivered through the second extruder and the pipe means to bond the second material to at least a portion of the surface of the extrusion to provide an extrusion with at least a portion of its surface having a wood grain appearance. An associated second extruder as well as an apparatus for producing an extrusion having a wood grain appearance is also disclosed.

It is an object of the invention to provide a method for making an extrusion having a wood grain finish.

It is a further object of the invention to provide an apparatus which will produce an extrusion having a wood grain finish.

It is a further object of the invention to introduce the materials used to create the wood grain finish as close to the die as is possible so as to create the wood grain finish.

It is a further object of the invention to resist premature mixing of the various melted colored vinyl pellets used to produce the wood grain appearance so that the mixture does not emerge from the small screw extruder as a solid color.

These and other objects of the invention will be more fully understood from the following description of the invention with reference to the drawings appended to this Application.

DESCRIPTION OF THE PREFERRED EMBODIMENTS

Figure 1:
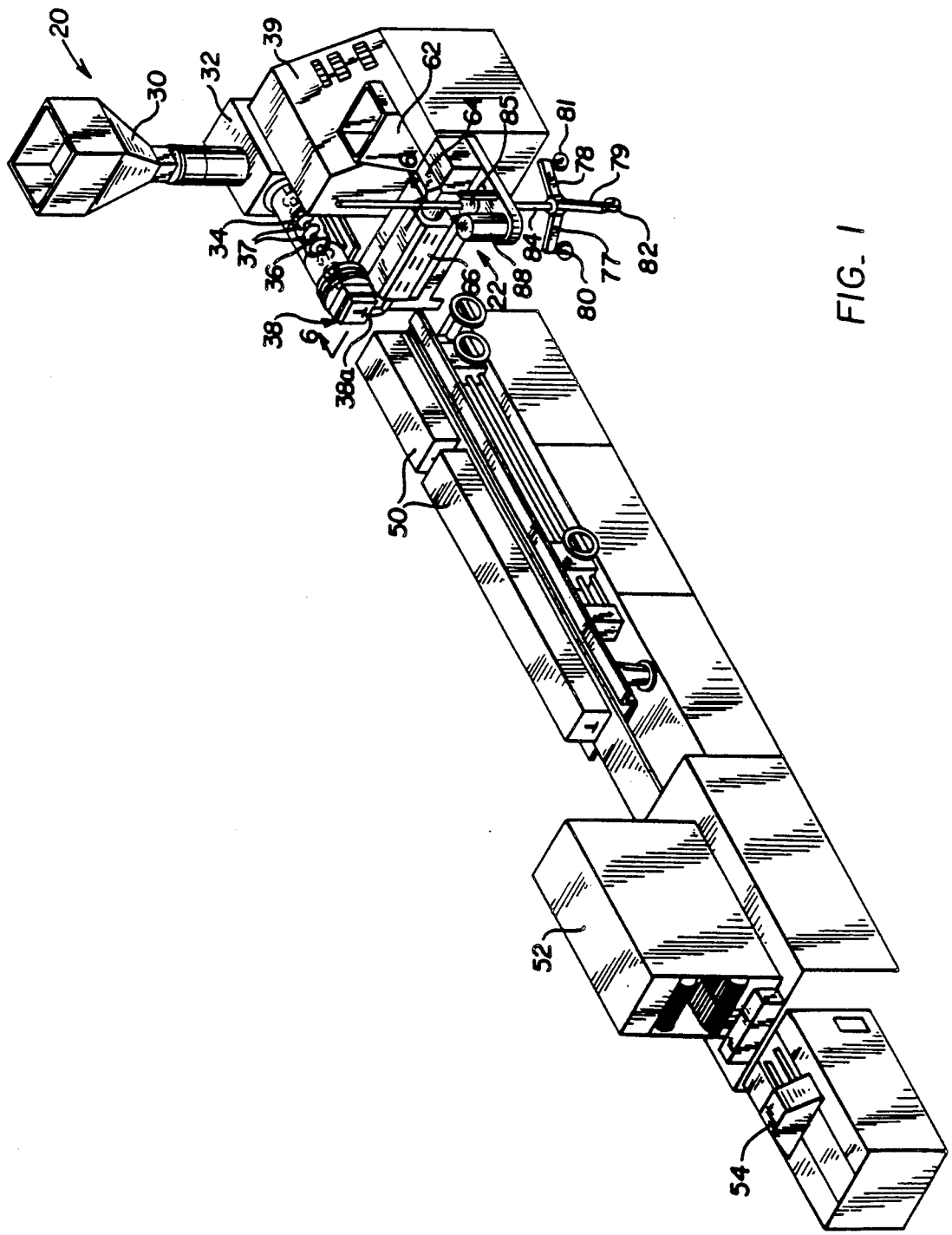
FIG. 1 is a perspective view, partially in section, of a main extruder line and a satellite extruder which together make an extrusion having a wood grain appearance.

Referring now to FIG. 1, the main extruder 20 and the satellite extruder 22 used in the method of the invention are shown. The main extruder 20 consists of a hopper 30 which receives and holds plastic pellets (not shown) that are used to create the extrusion and a feed section 32 which feeds the plastic pellets to the barrel 34 of the main extruder 20. The barrel 34 has disposed therein a screw 36 having flights 37 which advance the plastic pellets from the feed section 32 to the die means 38 where the plastic pellets are extruded to form the extrusion. The die means 38 has a profile 38a in the form of the final extruded product. The screw 36 extends all the way to the die means 38. A control center 39 is provided which has means for controlling the rotation of the screw 36 and the temperature of the barrel 34. It will be appreciated that a plastic powder instead of the plastic pellets can be used and that the use of plastic pellets that is described herein is for illustration purposes only and is not a limitation on the types of materials that can be used.

Figure 3:
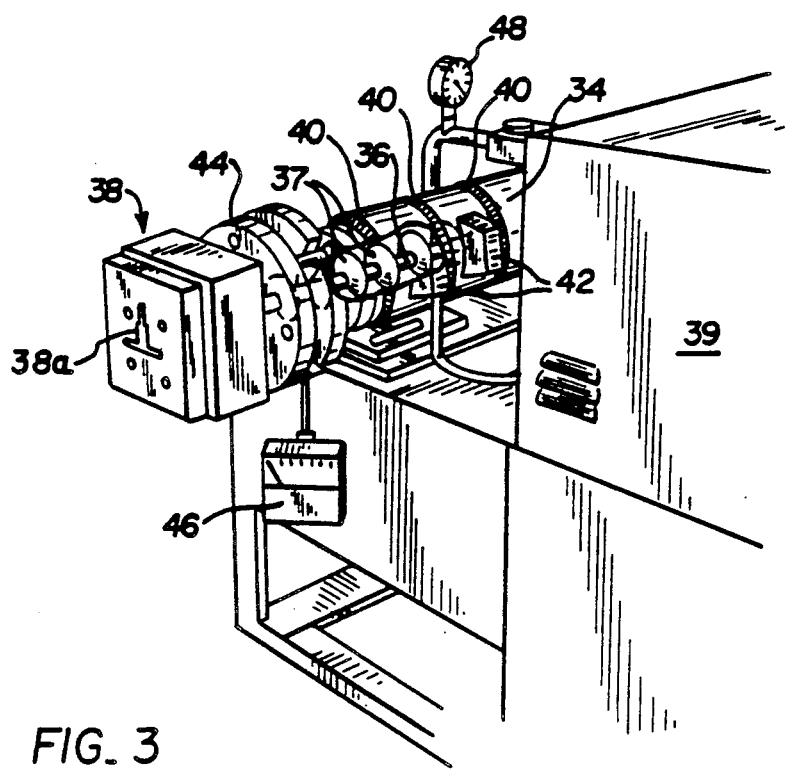
FIG. 3 is a detailed perspective view, partially in section, of the die means of the main extruder before the satellite extruder is connected thereto.

Referring more particularly to FIG. 3, it can be seen that the barrel 34 has several electric heating bands 40 which are connected to wiring box 42 and ultimately to a power source (not shown). The electric heating bands 40 supply heat to the barrel 34 which is used to melt the vinyl pellets which are transported through the barrel 34 by the screw 36. One end of the barrel 34 includes an adapter 44 which is in turn connected to the die means 38. A head pressure gage 46 is provided, as is a vacuum gage 48. These two items are conventional controls associated with extruder lines.

Referring back to FIG. 1, the main extruder line 20 further consists of a calibrator 50 which receives the extruded piece (not shown) from the die means 38 and which acts to further shape and size the extrusion. The extrusion is pulled through the extruder line by a puller 52 and is then cut by a saw 54 into predetermined lengths for further processing.

Figure 2:
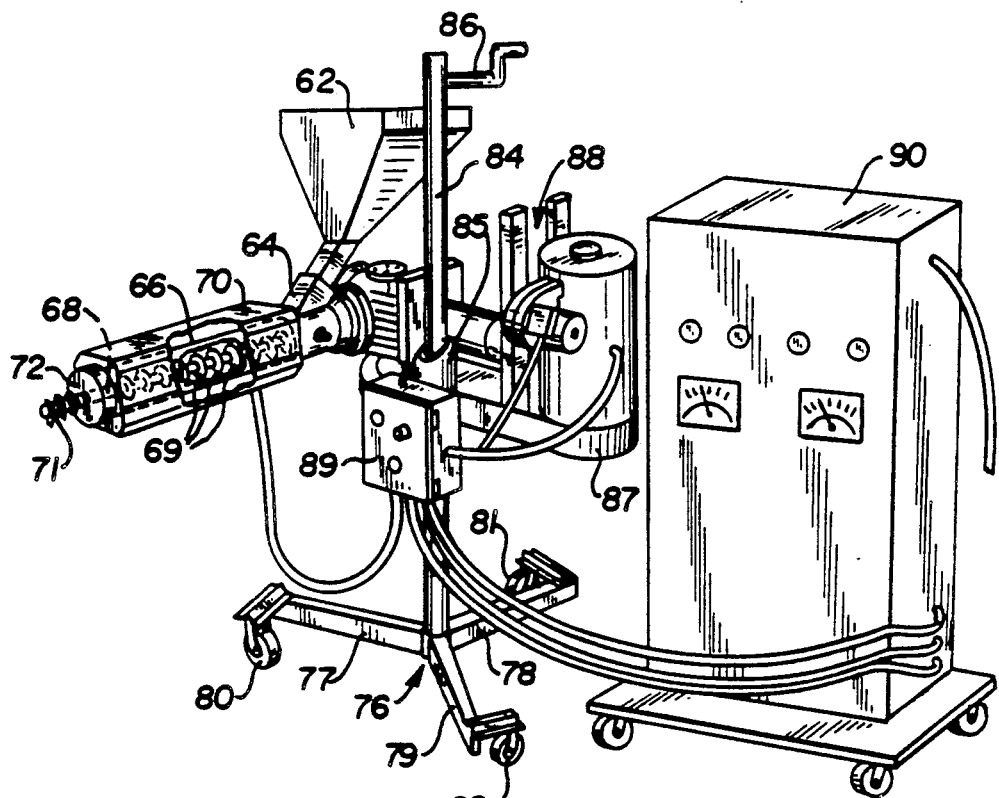
FIG. 2 is a perspective view, partially in section, of the satellite extruder of the invention which was shown in FIG. 1.

The satellite extruder 22 of the invention is shown in FIGS. 1 and 2. The satellite extruder 22 is powered by an outside power source (not shown) and consists of a hopper 62 which receives and holds plastic pellets (not shown) that are used to create the wood grain finish on at least a portion of the extrusion in accordance with the invention. The plastic pellets used to create the wood grain finish are typically a mixture of different colored pellets, such as white, brown and black. It will be appreciated that by changing the mixture of the pellets, the color and finish of the wood grain appearance will change. It will also be appreciated that other materials and forms of materials can be used in the satellite extruder 22 such as plastic powder, for example. The use of plastic pellets described herein is for illustrative purposes only and is not a limitation of the invention.

The satellite extruder 22 further consists of a feed section 64 which feeds the plastic pellets to the barrel 66 of the satellite extruder 22. The barrel 66 has disposed therein a screw 68 having flights 69 which advances the plastic pellets from the feed section 64 through the barrel 66. The barrel 66 is surrounded by a housing 70 which includes electric heating means (not shown). The screw 68 extends from the feed section 64, through the barrel 66 and projects outwardly from the barrel. The portion projecting outwardly from the barrel 66 is indicated as reference number 71. In addition, a plate 72 is provided on one end of the housing 70.

The satellite extruder 22 is portable and includes a base 76 having three spokes 77, 78 and 79. The three spokes 77, 78 and 79 have disposed on the underside of their respective free ends casters 80, 81 and 82. A standard 84 is connected to the base 76. The extruder is slidably mounted on the standard 84 by means of a sleeve 85, the extruder height being controlled by a handle 86 that operates to raise and lower the extruder.

In addition to supporting the extruder hopper 62, feed section 64 and housing 70, the base 76 and standard 84 also support a pedestal 87 which holds the motor and associated drive means 88 which drives the screw 68. A control box 89 is mounted on the sleeve 85. A control center and power source 90 is also provided.

Figure 4:
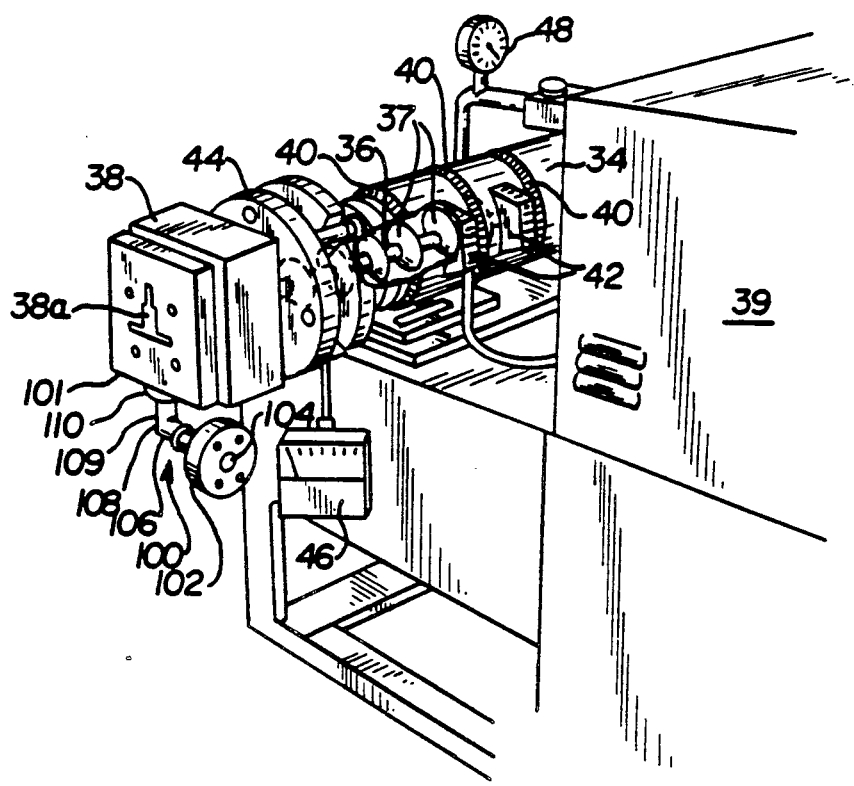
FIG. 4 is a detailed perspective view, partially in section, similar to FIG. 3 only showing the pipe means connected to the die means of the main extruder.
Figure 5:
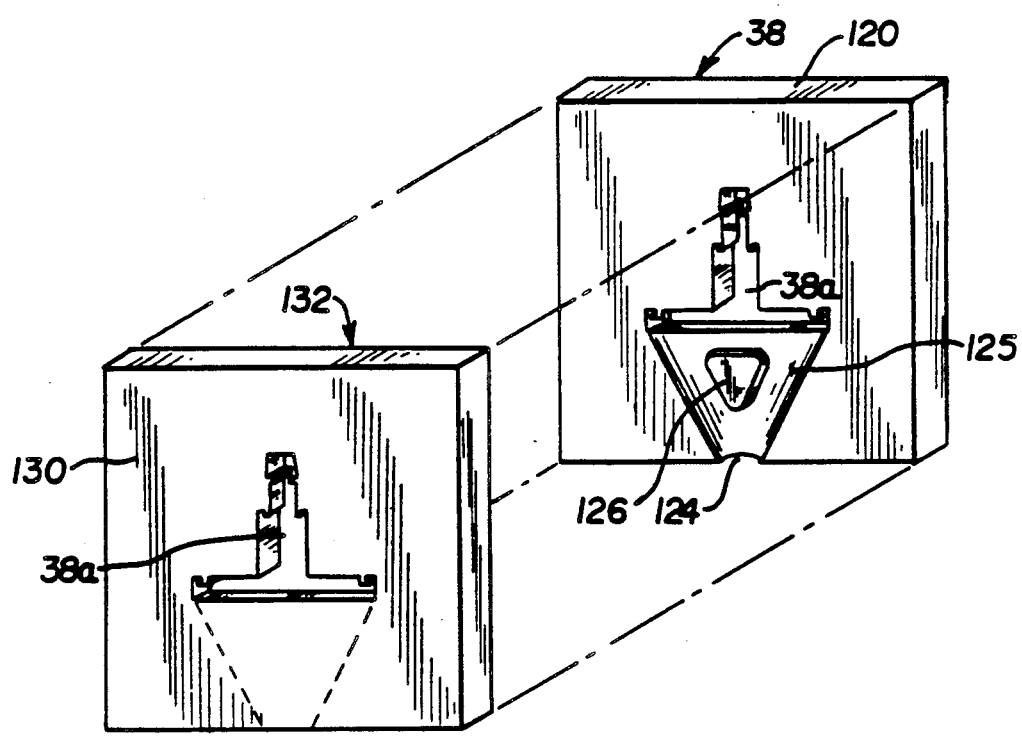
FIG. 5 is an exploded perspective view of the die means used on the main extruder shown in FIGS. 1, 3 and 4.
Figure 6:
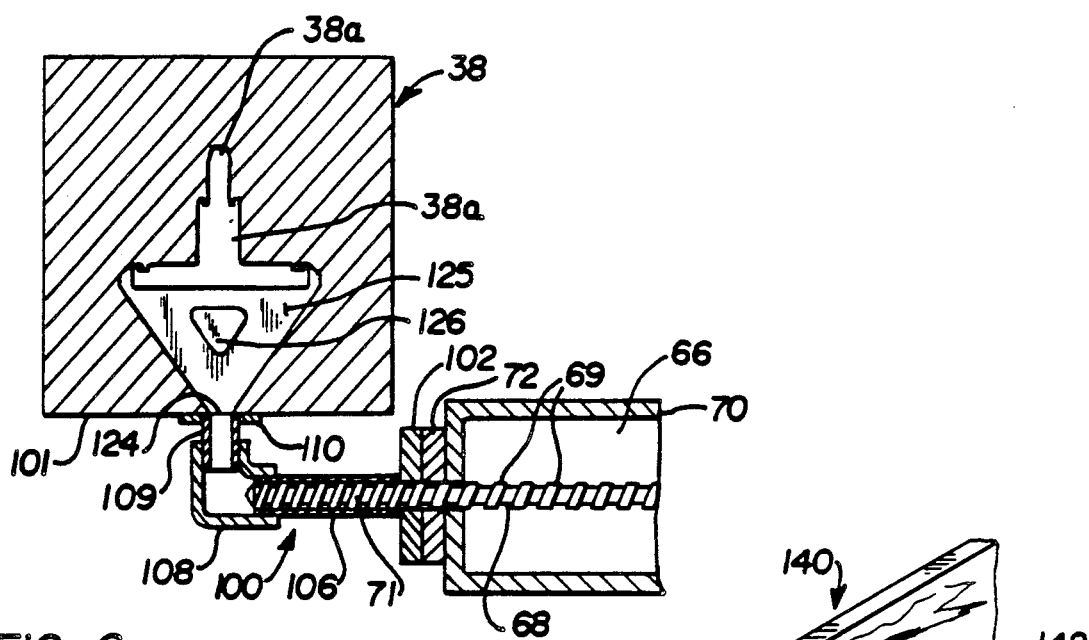
FIG. 6 is a cross-sectional view taken along line 6—6 of FIG. 1, showing the satellite extruder screw extension inserted in the pipe means and the pipe means connected to the die means.

Referring to FIGS. 4–11, the method of the invention will be explained. FIG. 4 shows a similar view as shown in FIG. 3, only with the addition of the pipe means 100 being connected to the underside 101 of the die means 38. Referring particularly to FIGS. 4 and 6 the pipe means 100 in the form shown is an elbow shape having an adapter 102 which defines a hole 104 and a first horizontal piece 106 and an elbow 108. The elbow 108 is connected to a vertical piece 109 which has a second adapter 110.

As will be appreciated, the pipe means 100 connects the satellite extruder 22 to the die means 38. Referring to FIG. 6, the extending portion 71 of the screw 68 of the satellite extruder 22 is inserted into the pipe means 100 through hole 104. Portion 71 extends into the pipe means 100 as shown in FIG. 6. Plate 72 contacts adapter 102 to form a seal between the satellite extruder 22 and the pipe means 100.

The plastic pellets are melted in the satellite extruder 22 and carried by the screw 68 to the pipe means 100. The molten material then flows through the die means 38 to contact the main extrusion from the main extruder 20. The die means 38 includes a two-part die as shown in FIG. 5. The back plate 120 defines the die profile 38a of the item to be extruded. The back plate also defines an orifice 124 through which the molten material in the pipe means 100 from the satellite extruder 22 can enter the die means 38. The back plate 120 has a channel 125 which receives the molten material from the satellite extruder 22. The back plate 120 can also include an insert 126 to facilitate even spreading of the molten material from the satellite extruder 22 on to the main extrusion. It will be appreciated that the size and shape of the insert 126 will change based on the portions of the main extrusion which are desired to have a wood grain appearance. The front plate 130 has a similar profile as the back plate 120, but has a smooth back surface 132. The front plate 130, when in use, is placed in intimate surface-to-surface contact with the back plate 120 (FIG. 4). It will be appreciated that the molten plastic is carried by the screw 68 through the barrel 66 and the pipe means 100 and flows through the orifice 124 into the channel 125 of the die means 38, around the insert 126 and contacts the main extrusion.

Figure 7:
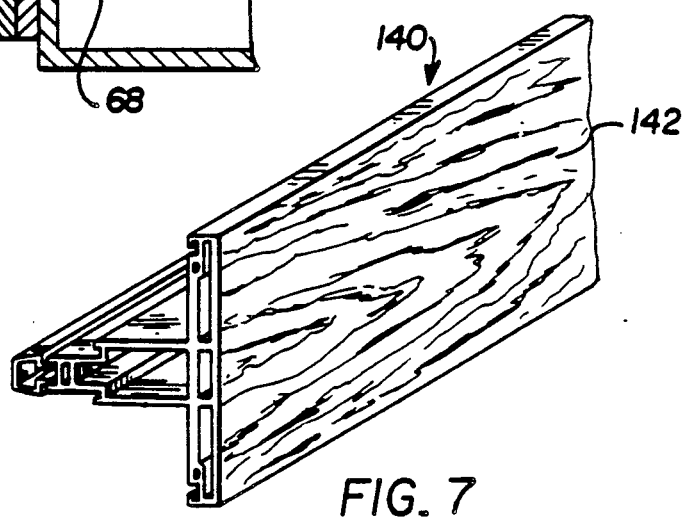
FIG. 7 is a perspective view of an extrusion having a section with a wood grain appearance made by the method of the invention.

FIG. 7 shows an extrusion 140 produced by the method of the invention. As can be seen, the extrusion 140 has a wood grain finish 142 on a portion of the extrusion 140. The wood grain appearance is accomplished by the method of the invention because the screw 68 of the satellite extruder extends as near as possible to the die means 38. This resists early mixture of the multi-colored pellets during melting which allows a more natural looking wood grain appearance (which has visible specs of white and black therein).

Figure 8:
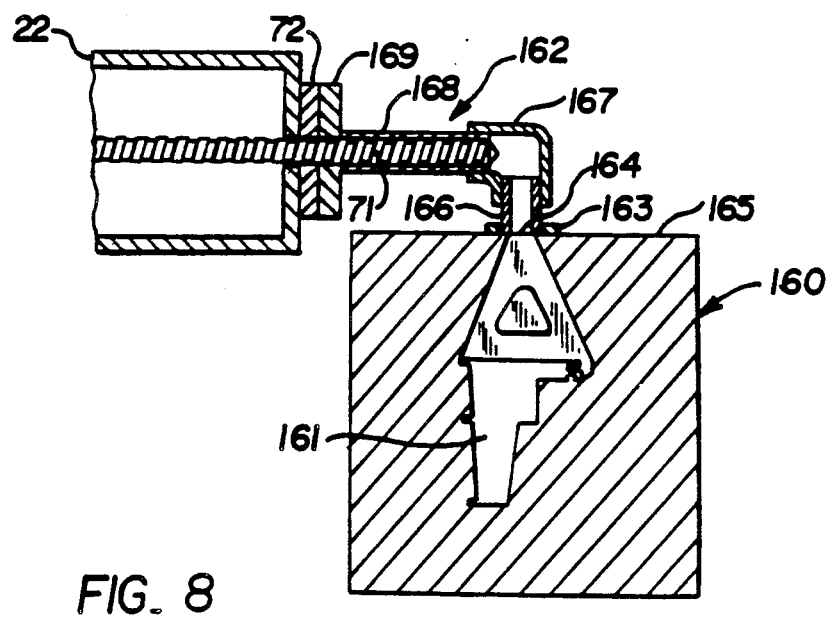
FIG. 8 is a cross-sectional view similar to FIG. 6 only showing (i) the die means used to make a different profiled extrusion having a section with a wood grain appearance and (ii) the pipe means connected to the top of the die means.
Figure 9:
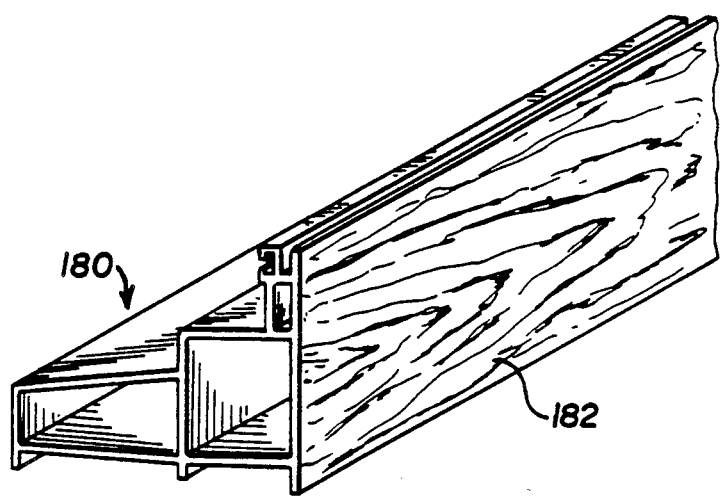
FIG. 9 is a perspective view of another extrusion made by the method of the invention.

It will be appreciated that different profiled extrusions can have at least portions with a wood grain finish. It will also be appreciated that the pipe means can be mounted to the die on the top or sides of the die means, not just the bottom of the die means (as shown by die means 38 and pipe means 100). FIG. 8 shows a die means 160 having profile 161 that is used to form the extrusion of FIG. 9. The pipe means 162 is attached to the die means 160 so that the molten material from the satellite extruder 22 enters the die means 160 through the top of the die means 160. The pipe means 162 is constructed similarly to pipe means 100. The pipe means 162 is in the shape of an elbow and consists of an adapter 163 which defines a hole 164. The adapter 163 is connected to the upper side 165 of the die means 160. A first vertical piece 166 is connected on one end to the adapter 163 and at its other end to an elbow 167. The elbow 167 is connected to a first horizontal piece 168. The other end of the first horizontal piece 168 is connected to a second adapter 169 which facilitates mounting the pipe means 162 to the plate 72 of the satellite extruder 22. The extending portion 71 of the satellite extruder 22 is shown inserted into the pipe means 160. FIG. 9 shows the extrusion produced by the die means 160 and pipe means 162 of FIG. 8. The extrusion 180 has a wood grain appearance 182 on one portion thereof.

Figure 10:
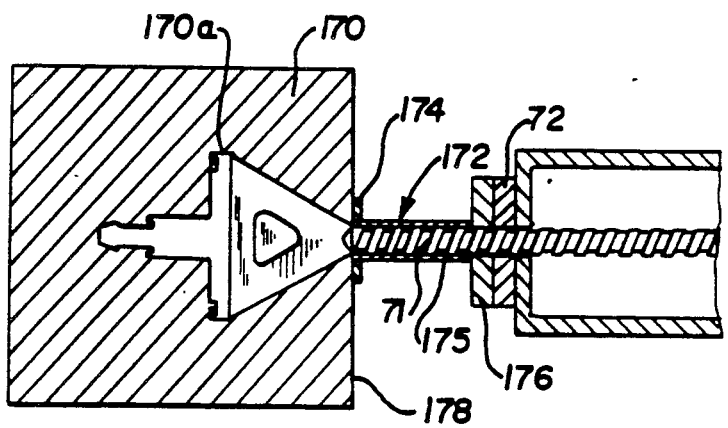
FIG. 10 is a cross-sectional view similar to FIG. 6 only showing pipe means entering the side of the die, the die having a similar profile as the die means of FIG. 5.

FIG. 10 shows a die means 170 in which a straight pipe means 172 is used. The pipe means 172 consists of a first adapter 174 connected to the side of the die means 170, a horizontal piece of pipe 175 and a second adapter 176 which connects to the plate 72 of the satellite extruder 22. The pipe means 172 is attached to the die means 170 such that the molten material from the satellite extruder 22 enters the die means 170 through one of the sides 178 of the die means 170.

Figure 11:
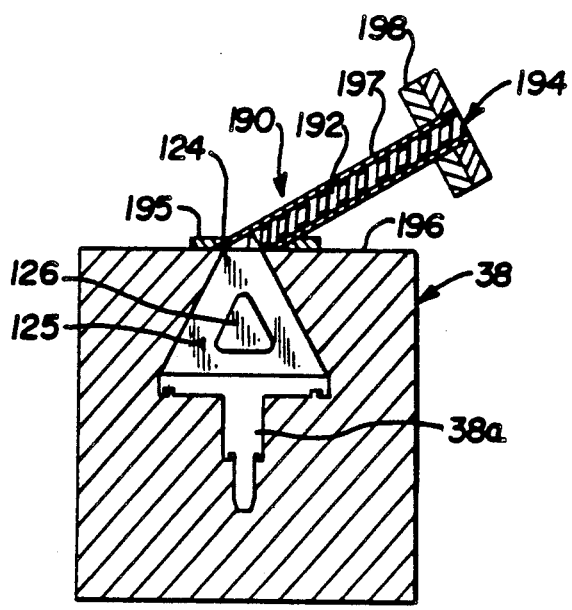
FIG. 11 is a cross-sectional view showing an alternate embodiment of the satellite extruder and pipe means.

FIG. 11 shows another embodiment of the pipe means 190 which accommodates a screw 192 which is angled relative to the die means 38. The die means 38 is the same as that used in FIG. 6 except that it is turned upside down. A satellite extruder 194 which has the ability to be angled can be accommodated by this pipe means 190. This pipe means 190 consists of a first adapter 195 which is connected to the upper side 196 of the die means 38 and having an angled pipe member 197 connected to its other side. The angled pipe member 197 has connected to its other end a second adapter 198. The second adapter 198 connects the pipe means to the satellite extruder 194. Similarly to FIGS. 6, 8 and 10, the molten material is conveyed by the screw 192 into the orifice 124 through channel 125 and around insert 126 of the die means 38 to contact and bond with the main extrusion. This creates the extrusion having a wood grain appearance shown in FIG. 7.

It will be appreciated that a method of producing an extrusion having at least a portion with a wood grain appearance is provided. A satellite extruder 22 having a screw feed means with a portion disposed in the housing and a portion projecting outwardly from the housing is also provided.

Whereas a particular embodiment of the invention has been described above, for purposes of illustration, it will be evident to those skilled in the art that numerous variations of the details may be made without departing from the invention as defined in the appended claims.

What is claimed is:

1. A method of producing an extrusion with at least a portion of its surface having a generally wood grain appearance, said method comprising:
   providing first extruder means including die means for forming an extrusion;
   providing second extruder means including (i) a housing and (ii) feed screw means having a portion disposed within said housing and a portion projecting outwardly from said housing with pipe means connecting said second extruder means to said die means;
   positioning said outwardly projecting portion of said feed screw means into said pipe means such that said outwardly projecting portion is disposed in relative spaced relationship with respect to said extrusion;
   extruding a first material through said die means to produce said extrusion;
   introducing a second material into said second extruder means; and
   delivering said second material through said second extruder means and said pipe means into said die means to bond said second material to at least a portion of the surface of said extrusion to provide said extrusion with at least a portion of its surface having a generally wood grain appearance.

2. The method of claim 1, including
   introducing said second material into said die means on the top portion of said die means, whereby said second material flows into said die means through the top of said die means.

3. The method of claim 1, including introducing said second material into said die means on the side portion of said die means, whereby said second material flows into said die means through the side of said die means.

4. The method of claim 1, including introducing said second material into said die means on the bottom portion of said die means, whereby said second material flows into said die means through the bottom of said die means.

5. The method of claim 1, including establishing said generally wood grain appearance on said extrusion by controlling the temperature of said second material.

6. The method of claim 1, including employing different color combinations in said second material to effect different wood grain appearances on said extrusion.

7. The method of claim 1, including employing vinyl as said first material.

8. A satellite extruder that is used in association with a main extruder having a die means and pipe means connecting said satellite extruder with said main extruder, said main extruder producing an extrusion from a first material, said satellite extruder comprising:
a housing;
means for delivering a second material into said housing;
feed screw means having a portion disposed within said housing and a portion projecting outwardly from said housing which is adapted to be inserted into said pipe means;
said outwardly projecting portion of said feed screw means is adapted to be disposed in relative spaced relationship with respect to said extrusion; and
means for heating said second material in said housing.

9. The apparatus of claim 8, wherein said pipe means is in the form of an elbow including a horizontal portion having one end for receiving said feed screw means projecting portion and a second end attached to a vertical portion, whereby said pipe means can be used to direct said second material to the top or bottom portion of said die means.

10. The apparatus of claim 8, wherein said pipe means is generally straight including a horizontal portion having one end for receiving said feed screw means projecting portion and a second end attached to said die means, whereby said pipe means can be used to direct said second material to the side of said die means.

11. The apparatus of claim 8, including means for adjusting the position of said housing so that said extending portion can be received in said pipe means.

12. The apparatus of claim 11, wherein said housing is mounted on a portable base.

13. An apparatus for producing an extrusion with at least a portion of its surface having a generally wood grain appearance, said apparatus comprising:
a first extruder means including die means for forming an extrusion;
second extruder means including (i) a housing and (ii) feed screw means having a portion disposed within said housing and a portion projecting outwardly from said housing; and
pipe means connecting said second extruder means with said die means;
said outwardly projecting portion of said feed screw means being disposed in relative spaced relationship with respect to said extrusion.

14. The apparatus of claim 13, wherein said pipe means is in the form of an elbow including a horizontal portion having one end for receiving said feed screw means projecting portion and a second end attached to a vertical portion, whereby said pipe means can be used to direct said second material to the top or bottom portion of said die means.

15. The apparatus of claim 13, wherein said pipe means is generally straight including a horizontal portion having one end for receiving said feed screw means projecting portion and a second end attached to said die means, whereby said pipe means can be used to direct said second material to the side of said die means.

16. The apparatus of claim 13, including means for adjusting the position of said housing so that said extending portion can be received in said pipe means.

17. The apparatus of claim 16, wherein said housing is mounted on a portable base.

* * * * *